United States Patent [19]

Winkler et al.

[11] 4,318,171
[45] Mar. 2, 1982

[54] METHOD OF THREE COMMUTATION ON RECTIFIERS AND OF INVERTED ELECTRIC CURRENT CONVERTERS

[75] Inventors: Jiri Winkler; Josef Cibulka, both of Prague, Czechoslovakia

[73] Assignee: CKD PRAHA, Oborovy podnik, Prague, Czechoslovakia

[21] Appl. No.: 144,570

[22] Filed: Apr. 28, 1980

Related U.S. Application Data

[63] Continuation-in-part of Ser. No. 11,948, Feb. 13, 1979, abandoned.

[30] Foreign Application Priority Data

Feb. 14, 1978 [CS] Czechoslovakia .................. 956-78

[51] Int. Cl.³ .......................................... H02M 7/515
[52] U.S. Cl. ..................................... 363/138; 363/37; 363/96
[58] Field of Search ................... 363/34, 37, 95, 96, 363/135–138; 318/801, 807–812; 307/252 M, 252 P, 252 Q

[56] References Cited

U.S. PATENT DOCUMENTS

| | | | |
|---|---|---|---|
| 3,474,322 | 10/1969 | King .............................. | 363/137 X |
| 3,825,813 | 7/1974 | Wirtz ............................. | 363/138 |
| 3,980,941 | 9/1976 | Griebel .......................... | 363/138 |
| 4,054,818 | 10/1977 | Risberg ......................... | 363/138 X |
| 4,072,882 | 2/1978 | Wiart et al. .................... | 363/138 X |
| 4,087,851 | 5/1978 | Klautschek .................... | 363/138 X |
| 4,146,920 | 3/1979 | Wills .............................. | 363/138 X |

Primary Examiner—William M. Shoop
Assistant Examiner—Peter S. Wong

[57] ABSTRACT

A three phase current inverter has a commutation circuit wherein a blocking voltage is generated which is applied from the anode to the cathode of the main control thyristors. The load current from the then-conductive phase is simultaneously transferred to the commutating or disconnect circuit. A separate accumulation circuit including a capacitor then takes over the load current, the energy stored in the load inductance being transferred to the capacitance in the accumulation circuit. The control thyristor for the next phase is switched to the conductive state, current is transferred from the accumulation circuit to the subsequent output phase and from the load of the first phase to the load of the second phase. The capacitor in the disconnect circuit is smaller than that in the accumulation circuit so that optimum characteristics for both circuits are obtained.

7 Claims, 8 Drawing Figures

METHOD OF THREE COMMUTATION ON RECTIFIERS AND OF INVERTED ELECTRIC CURRENT CONVERTERS

This application is a continuation in part of my co-pending application Ser. No. 11,948, filed on Feb. 13, 1979, now abandoned.

FIELD OF THE INVENTION

The present invention relates to methods and apparatus for commutation in rectifiers and inverters. It is particularly adapted for regulation of electric alternating current machines.

BACKGROUND AND PRIOR ART

A rectifier is a converter which rectifies alternating current from alternating m-phase line current into direct current, with smoothing inductances on the D.C. side or generally with such impedance conditions, that this rectifier operates as a constant current source. An inverter is a converter which transforms direct current from a current source into alternating current, for the loads such as alternating current machines or network represented by a combination of RLC elements. The main difference between a rectifier and an inverter is the fundamental direction of flow of electric power. In a rectifier power flows from the alternating current side to the direct current side. In an inverter it is from the direct current side to the alternating current load. It is possible and in practice quite frequent, that at certain conditions of operation, the flow of power is reversed.

Where rectifiers and inverters are connected to a network, the fundamental method of control of the output is phase control and the fundamental process in the course of operation of an inverter is external commutation. The passage of current from one main branch of a converter to the following—the commutation—is controlled by external voltage. The commutation time, i.e. the time of transfer of current is determined by the angle of phase control, by the magnitude of current and by impedance conditions at the source and load. Semiconductor converters are mostly used as rectifiers with external commutation and the operation of external commutation and the other properties of these converters are commonly known and described in detail in technical papers.

Rectifiers and inverters with internal commutation have the same fundamental properties as similar converters with external commutation. The current commutation, however, does not proceed spontaneously by action of external voltage, but is forced by auxiliary circuits of the converter. The cause thereof is, for instance, a passive load on the alternating side of the inverter, or such a phase position of the alternating voltage at the moment of commutation, that the alternating voltage cannot cause an external commutation. This is rather linked to the direction of flow of idle power. It can be generally said that external commutation is possible where the alternating side is capable of furnishing idle power, for instance with a supply network. Internal commutation is possible in all other cases, for example with passive load, an electric motor or a supply network. Internal commutation can be introduced with all types of loads. It is above all a consequence of how complicated the converter is and how high the respective costs are, that at present rectifiers or inverters with external commutation prevail.

The most significant practical application of rectifiers or inverters with internal commutation are inverters for driving asynchronous motors. It can be supposed that a further important application will be a rectifier or an inverter on a network for power factor compensation, possibly also D.C. drives with improved energy parameters.

Known rectifiers or inverters, without regard to different alternatives of auxiliary commutation circuits, have one common property. It is the characteristic course of the commutation process, which has practically the same properties in entirely different commutation circuits. It is therefore necessary for simplicity to introduce the term "degree of commutation". The degree of commutation is the number of transitions between branches, between main and auxiliary branches, of the converter, which is required for execution of the complete commutation. A complete commutation in rectifiers and inverters involves the complete transfer of current from one main branch to the following main branch. In practice it means the transfer of current from one phase of the alternating side to the following one.

Direct commutation, where electric current passes directly from one main branch to the following, for instance common external commutation, is, from this point of view, a single stage commutation.

Indirect commutation, where electric current in a transfer from one main branch to the following one commutates at first to an auxiliary branch of the converter is at least a two stage commutation. For voltage inverters and also for other types of converters with internal commutation, for instance in pulse converters, the internal commutation proceeds mostly in two stages, and is therefore a two stage commutation.

Thus, the first stage of a two stage commutation is commutation from the main branch to the auxiliary one and generally includes a commutation capacitor, reactors and auxiliary thyristors. The second stage of the two stage commutation is a commutation from the auxiliary branch to the following branch, or main branch, for instance to a return diode of a voltage inverter and to a pulse converter or to a main thyristor of the following phase of a current inverter.

Current inverters with internal commutation are at present used predominantly for speed regulation of asynchronous motors. In known power circuits with thyristors the commutation process proceeds in two stages. The first stage commutation is from the main thyristor to the auxiliary circuit of the commutation capacitor without change in the load current of the phase. In the second stage, commutation is from the auxiliary circuit of the commutation capacitor to the following phase. The transfer of load current between phases proceeds only during the second stage.

To clarify the concept of two stage commutation, the operation of a known two stage commutation system will be discussed with reference to FIGS. 1 and 2. In FIG. 1, a three-phase load $L_r$, $L_s$, and $L_t$ is shown. A DC current, $I_d$, is supplied to the system. A first main input terminal of the circuit is connected to the anodes of the main thyristors V1, V3, V5 and auxiliary thyristors V11, V13 and V15. The cathodes of thyristors V1, V3 and V5 are connected to one terminal of loads $L_r$, $L_s$, and $L_t$, respectively, the other terminals of the loads being connected in common. The cathodes of thyristors V1, V3 and V5 are also connected respectively to the anodes of thyristors V4, V6 and V2, whose cathodes are connected in common to the second main terminal. Commutating capacitors C1, C2 and C3 are connected from the cathodes of thyristors V11, V13 and V15 to the cathodes of thyristors V1, V3 and V5, respectively. The cathodes of auxiliary thyristors V11, V13 and V15 are connected to the second main input terminal through thyristors V14, V16 and V12, respectively.

Let it first be supposed that current flows via V1 to phase R of the load, and returns via phase T of the load and V2. At time t0, auxiliary thyristor V11 and thyristor V3 are switched to the conductive state. Capacitor C1 is charged to the polarity indicated in FIG. 1. After thyristor V11 has been switched to the conductive state, the current passes from the path including V1 to the path including V11 and C1. This process has finished at time $t_1$. Capacitor C1 is charged up to time $t_2$ by the load current, cutoff voltage being applied to thyristors V1 from time $t_1$ to time $t_2$ (see FIG. 2).

From time $t_2$ to time $t_3$ the capacitor charges in the opposite direction, i.e. to a polarity opposite that shown in FIG. 1. At time $t_3$, the voltage across capacitor C1 is equal to a value $U_{sr}$, that is, it is equal to the instantaneous voltage between terminals R and S of the load. At this point, thyristor V3 begins to conduct and commutation takes place from the path including V11, and C1 of phase R to the path including V3, phase S of the load. Thus, the commutation of current in the load takes place within the time interval $t_3$ to $t_4$. During this time, the capacitor C1 is charged to a value such that the voltage across it exceeds voltage $U_{sr}$ by a voltage $\Delta U$ given by the following equation:

$$\Delta U = I\sqrt{\frac{L_R + L_S}{C}}$$

which—under the condition of $L_R = L_S = L$—can be put as $$\Delta u = \sqrt{I\frac{2L}{C}}$$

Thus the final voltage value on the capacitor is $$u_C = U_{SR} + \Delta u$$

It will be noted that the above described two-stage commutation has the following disadvantages:

Since the commutation circuits are used both for disconnecting the thyristors and for accumulating power from the inductance of the load, the capacitors must fulfill two rather different functions with partly opposing requirements. Specifically, it is desirable that the time interval $t_1$ to $t_2$ in FIG. 2 correspond to the blocking time of thyristors, namely approximately 50 μsec. This leads to a relatively small capacitance value. The low capacitance value would then lead to such high overvoltage on the capacitor and on the thyristors that voltage damage could occur. Thus, while reduction of the capacity of the capacitor optimizes the blocking of the thyristors, for purposes of accumulation of energy, a larger capacitance value would be preferable.

Secondly, the commutation capacitor must be matched to the load, that is changes in the commutation circuit and, in particular, in the commutation capacitor would be required for different motor loads. This, of course, is a great disadvantage.

SUMMARY OF THE INVENTION

It is an object of the present invention to furnish an inverter which does not have the above described drawbacks.

In the three-stage commutation according to the method and system of the present invention, the function of blocking the main valve (thyristor) and the function of securing accumulation of power from the inductances of the load onto auxiliary capacitors are separated. By separating these functions, the following advantages are obtained:

An auxiliary circuit for securing the disconnection of thyristors is proposed which is capable of blocking the current in the thyristor, thereby reducing current to zero at a defined rate and renewing the thyristor's blocking properties without regard to the accumulation of power and the inductance of the load. An auxiliary circuit securing accumulation of power from the inductance of the load is proposed so that power from the load may be accumulated without dangerous overloads.

It is obvious that by separating the two functions it is no longer necessary to be concerned about a direct connection of the motor to the inverter, as the commutation circuits securing the disconnection of the thyristor are designed for the maximum electric current of the load, or nominal load of the converter, and to parameters of the thyristors. The auxiliary accumulation circuits must, however, be adjusted to the respective parameters of different motors. In practice this is reduced particularly to the adjustment of regulation loops. Inverters with three stage commutation are therefore also suitable for driving different motors.

The change from two stage commutation to three stage commutation has some common results for the circuit design of auxiliary commutation branches of the inverter. They can be described as follows: Relative to inverters which operate with two stage commutation, the commutation capacitors $C_K$ are reduced so that the interval $t_1$ to $t_2$ in FIG. 1 corresponds to the blocking time of thyristors, approximately to 50 microseconds. Thus the condenser is reduced in practice up to 10%. Without further arrangements this would lead to such a high overvoltage on the capacitor and thus also on the thyristors, that voltage damage could occur. By reduction of the capacity it has been made possible to optimize the first function of auxiliary circuits of the inverter, namely the disconnection of thyristors. The second function, accumulation, is best carried out by another auxiliary converter. In practice this is reduced to a rectifier, most frequently to a diode rectifier in a bridge connection, which is suitably connected to the inverter.

A cyclically operable converter system according to the present invention has AC circuits having at least a first and second circuit associated, respectively, with a first and second AC phase. It further has a DC circuit, a load, and controllable main switch means connected in said first and second circuit for controlling the current flow therein. The apparatus of the present invention is an apparatus for carrying out a three stage commutation transferring current from the first to the second circuit. It comprises auxiliary disconnect circuit means operative independently of said controllable main switch means for generating a blocking signal, applying said blocking signal to said controllable switch means of said first circuit, and taking over said current from said first circuit starting at a first predetermined time instant in said cyclical operation. Auxiliary accumulation circuit means is also provided. This is connected to the auxiliary disconnect circuit means for receiving current therefrom starting at a second predetermined time instant following said first predetermined time instant, and for transferring said current to said second phase. The auxiliary accumulation circuit means comprises an accumulating capacitor for storing commutation energy.

The novel features, which are considered as characteristics of the invention, are set forth in particular in the appended claims. The invention itself, however, both as to its construction and its method of operation, together with additional objects and advantages thereof will best be understood from the following description of specific embodiments when read in connection with the accompanying drawing.

BRIEF DESCRIPTION OF THE DRAWING

FIG. 3b is a timing diagram associated with the circuit of FIG. 3a;

DESCRIPTION OF THE PREFERRED EMBODIMENT

Figure 1:
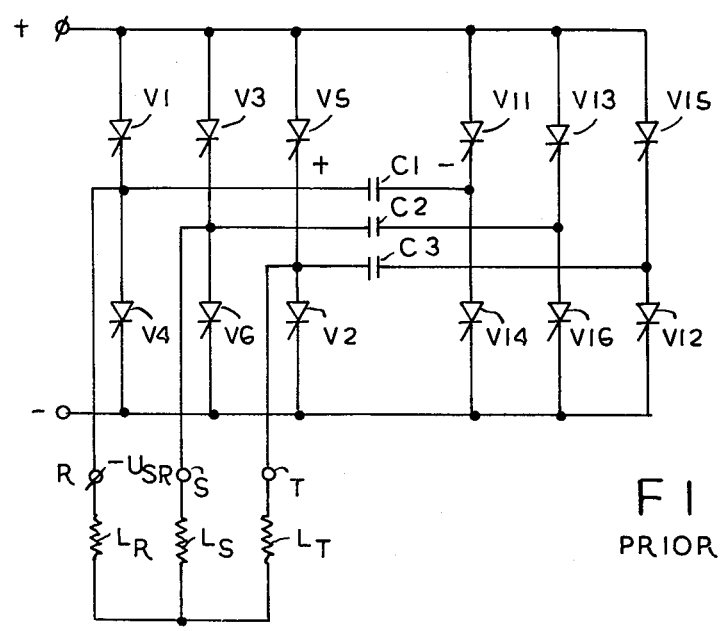
FIG. 1 is a simplified circuit diagram illustrating the prior art two stage commutation.
Figure 2:
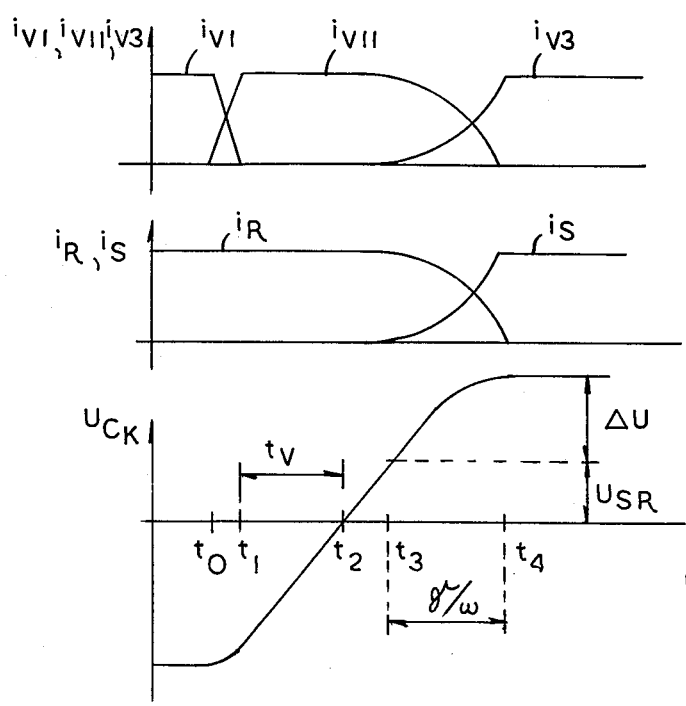
FIG. 2 is a timing diagram associated with the circuit of FIG. 1.
Figure 3A:
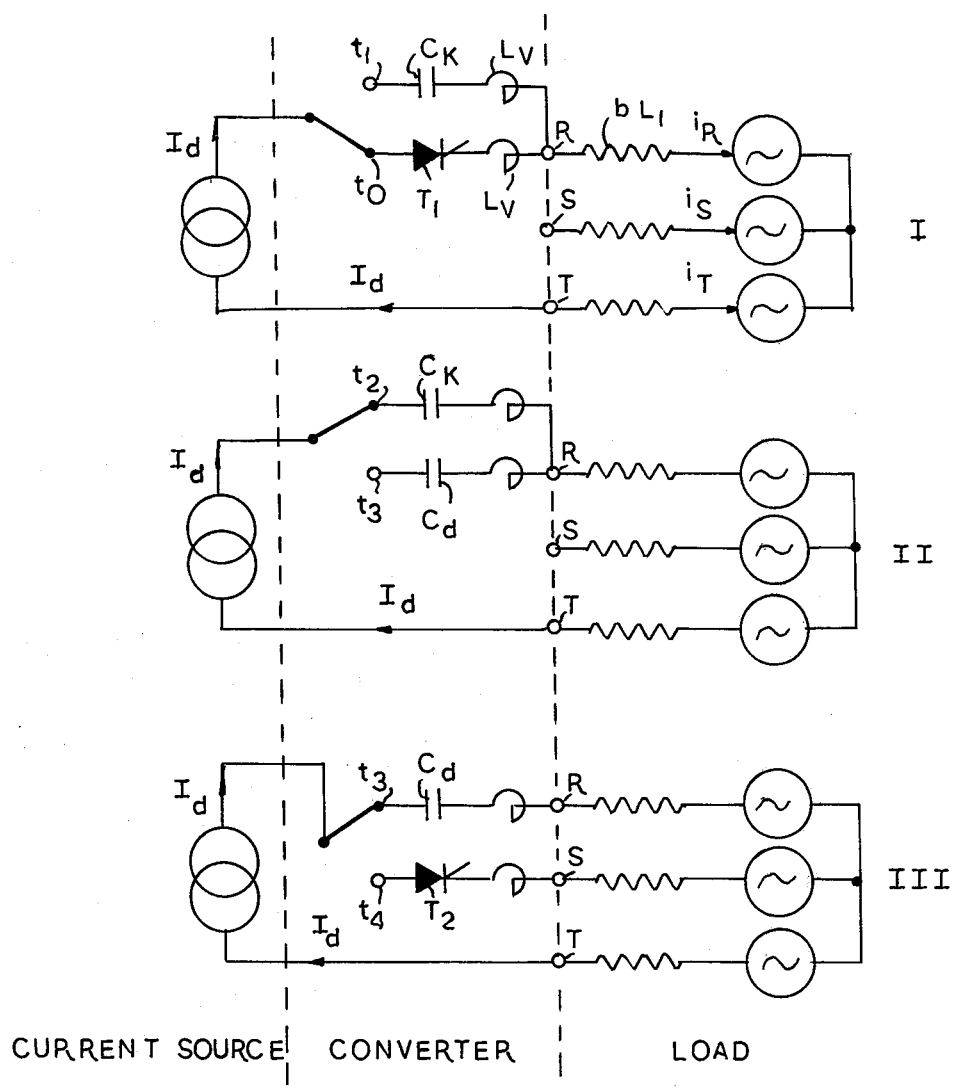
FIG. 3a is a simplified diagram illustrating three stage commutation.
Figure 3B:
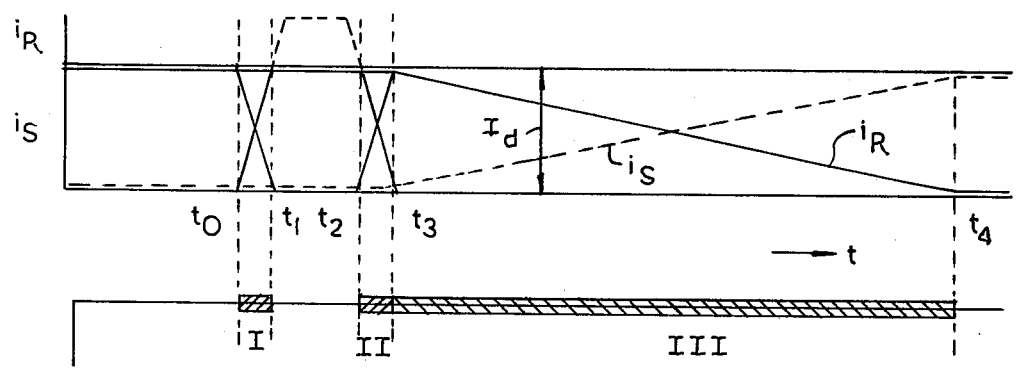
Figure 5:
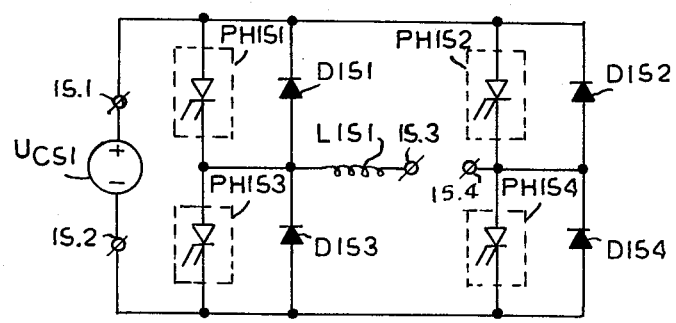
FIGS. 5 and 6 are pulse converters suitable for use in the current source of FIG. 4.

The basic idea of three stage commutation will be illustrated referring to FIGS. 3a and 3b.

Three stage commutation proceeds in the following stages:

I. stage—interval $t_0$ to $t_1$—commutation from the main thyristor $T_1$ to auxiliary tyristors, inductances and commutation capacitor $C_K$. The inductances $L_v$ in FIG. 3a represent the internal inductances of branches and inductances for limiting rapid current fluctuations.

II. stage—interval $t_2$ to $t_3$—commutation from the branch of capacitor $C_K$ to the auxiliary branch of the accumulation capacitor $C_d$. The capacitor $C_d$ is a D.C. capacitor situated behind the rectifier.

III. stage—interval $t_3$ to $t_4$—commutation from the auxiliary capacitor $C_d$ to the main branch of thyristor $T_2$, and load current commutation from phase R to phase S.

Figure 7:
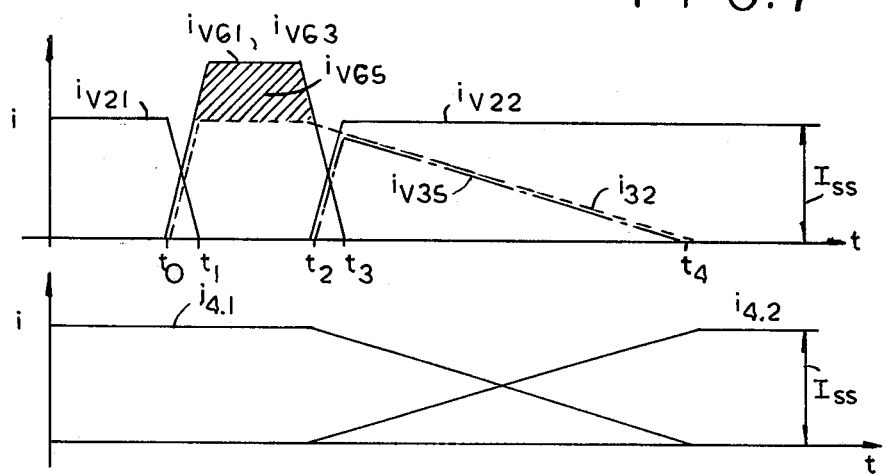
FIG. 7 is a timing diagram associated with the circuit of FIG. 4.

In some types of inverters with three stage commutation intervals $t_2$ to $t_3$ and $t_3$ to $t_4$ can overlap, that is thyristor $T_2$ may be switched on at time $t_2$ (see FIG. 7). Since time interval $t_2$–$t_3$ is much smaller than time interval $t_3$–$t_4$ (20 microseconds and about 1,000 microseconds, respectively) this timing is insignificant. However, full load current is not switched to phase S and carried by $T_2$ until time $t_4$.

Figure 4:
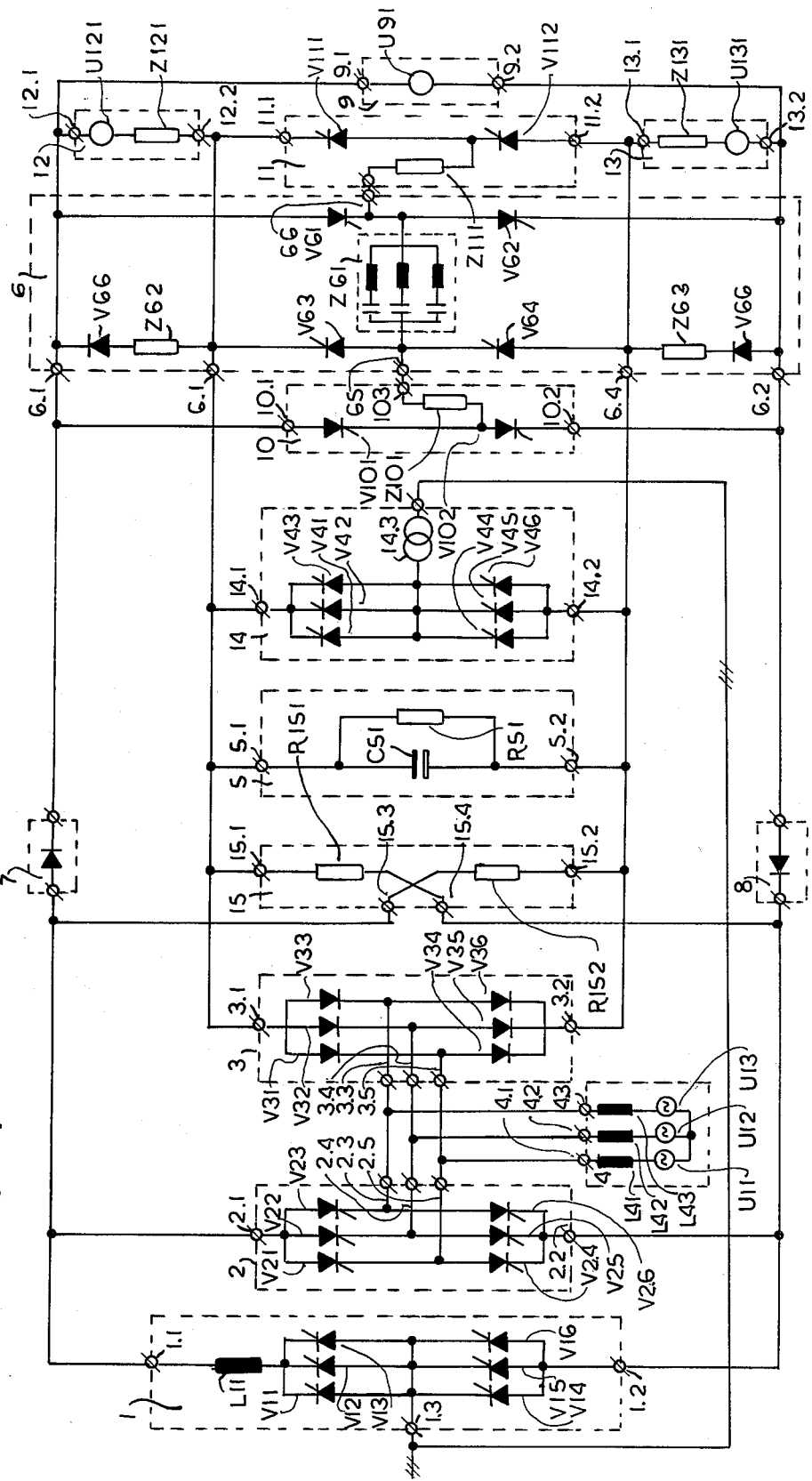
FIG. 4 is a schematic diagram of a three stage commutation circuit according to the present invention.

It is obvious that, in comparison with two stage commutation, the transfer of current between phases, i.e. accumulation of load energy in auxiliary capacitors, is accomplished in the third stage when the auxiliary disconnecting circuit is already disconnected. Thus the disconnecting circuit acts independently of any accumulation of load energy. Specific disconnecting circuits are illustrated in FIG. 4 and will be discussed with reference to this figure, although, of course, many variations thereof are possible. As also illustrated in FIG. 4 and discussed in connection therewith, the rectifiers (V31–V36) which are part of the accumulation circuit can also be part of the disconnecting circuit.

The important thing to remember about the accumulation circuit is that, in the third commutation stage, it is connected in series with the above mentioned rectifier on the DC side of the latter. The voltage across the capacitor opposes the direction of current flow in the phase in which the current is decreasing and therefore causes the proper commutation to the new phase. In the limiting case, accumulation capacitor $C_d$ becomes infinitesimal and can be considered equivalent to a counter voltage which is introduced into the commuting phase. This counter voltage can be considered an additional commutation voltage which causes the commutation of current between two phases, regardless of whether or not the load is capable of external commutation. During each commutation, a certain amount of energy is accumulated in capacitor $C_d$, the energy being proportional to the magnitude of the current and to the duration of commutation. This energy must then be removed from capacitor $C_d$ so that an equilibrium is established. For low energies, it is possible to discharge the capacitor into a resistor or to remove energy by way of a controlled converter to the supply network. The amount of energy accumulated in capacitor $C_d$ is a function of the energy accumulated in the inductance of the load. The amount of energy removed from the accumulation capacitor relative to the output of the main converter is an important parameter of the inverter or current rectifier having three stage commutation.

For an asynchronous motor and for a synchronous motor as well as for a load represented by a network, the magnitude of removed energy is for the most part the amount of energy in the inductances connected in series with the internal induced voltages in FIG. 3a. When a network is connected to an inverter with three stage commutation, a very small commutation angle and small accumulated energy results due to small stray inductances. For instance, two to six electrical degrees are typical. The amplitude of the commutation angle can be controlled by the amplitude of voltage on accumulation capacitor $C_d$ and thus influence the commutation process.

For asynchronous motors, due to larger stray inductances, the commutation angle amounts to from five to twenty electrical degrees. A larger accumulation of power results, and may constitute from about four to about 15 percent of the nominal output of the motor.

Figure 6:
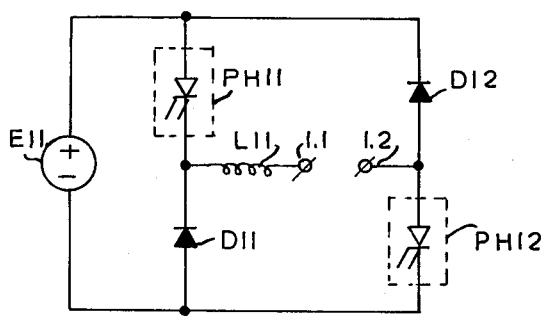

The overall circuit of the present invention is shown in FIG. 4. If an AC network supply is used, the current source 1 in FIG. 4 may consist of six thyristors, V11–V16 connected to form a three-phase fully controlled bridge circuit. Alternatively, DC current can be supplied by means of the pulse converter circuit shown in FIG. 6. The output current of the current source 1 is applied to an inverter block 2 to whose output terminals 2.3, 2.4, 2.5 is connected a load 4. Load 4 is indicated in FIG. 4 as a three phase load, each phase including an inductance (L41, L42, L43) in series with an internal induced emf (U11, U12, U13). Block 2 consists of thyristors V21 and V24 connected in series from an input terminal 2.1 to an input terminal 2.2 and thyristors V22, V25 and V23, V26 similarly connected from terminal 2.1 to terminal 2.2. Output terminals 2.3, 2.4, and 2.5 are connected to the common points of thyristors V23, V26; V22, V25; and V21, V24, respectively.

A rectifier block 3 has input terminals 3.1 and 3.2 and output terminals 3.3, 3.4, and 3.5, the output terminals being connected to output terminals 2.3, 2.4 and 2.5, respectively. Rectifiers V31, V32 and V33 are connected from terminal 3.1 to terminals 3.5, 3.4 and 3.3, respectively, while rectifiers V34, V35 and V36 are connected from terminals 3.5, 3.4 and 3.3, respectively to terminal 3.2. Block 3 has a two-fold function. On the one hand, it serves to withdraw idle power from load 4 to an accumulating capacitor block 5 and, secondly, it supplies a commuting voltage from a commutation block 6 to the thyristors of block 2.

Accumulating capacitor C51 is connected in parallel with block 3, as is a resistor R51. The power transferred from load 4 to accumulating capacitor block 5 can either be dissipated on the discharge resistor R51 or applied to a DC circuit by means of a circuit block 15 having input terminals 15.1 and 15.2 connected to terminals 5.1 and 5.2 of capacitor block 5, and output terminals 15.3 and 15.4 connected to output terminals 1.1 and 1.2 of current source 1. A resistor R151 is connected from terminal 15.1 to terminal 15.4, while a resistor R152 is connected from terminal 15.2 to terminal 15.3. The power stored on capacitor C51 can also be dissipated through application to an AC network by means of a controlled rectifier circuit in a block 14. Also shown in FIG. 4 is a commutating circuit 6 comprising four auxiliary commutating thyristors V61-V64, two overswing rectifiers V65 and V66, two overswing impedances Z62, Z63 and a commutating impedance Z61.

Since the commutating system of the present invention differs considerably from that of the known art, it will be described first, and in detail. The commutating impedance Z61 consists of suitably arranged series, parallel, or series-parallel combinations of capacitors, chokes, resistors, supersaturated coils, or other elements of achieving the desired commutation current pulse. The simplest embodiment is a series LC circuit. For high power applications, more complicated commutating impedances are used, so that the active commutating elements can be used to better advantage. The most advantageous overswing shape is a trapezoidal form, the leading edges of the trapezoid being determined by the allowable steepness of current increase di/dt for the particular valves used, while the amplitude is determined by the maximum load current. The time at which the trapezoidal current pulse occurs determines the switch off instant of the thyristor in block 2. In the beginning phase, the capacitor or group of capacitors in the commutating impedance Z61 is charged to the appropriate polarity, e.g. the positive pole being on the anode of V63. For these initial conditions, a half-sinusoidal or trapezoidal overswing takes place after thyristors V61 and V63 are switched to the conductive state. The voltage across the overswing impedance Z62, connected in series with the overswing rectifier V65, will become more positive at terminal 6.3 and more negative at terminal 6.1. The positive voltage is applied to terminals 2.3, 2.4 and 2.5 through rectifiers V31, V32 and V33, respectively, while the negative voltage is applied to terminal 2.1, i.e. to the anodes of thyristors V21-V23. Thyristors V21-V23 are thus blocked.

The overswing impedances Z62, Z63 can consist of resistors, choke coils, a supersaturated coil, a secondary winding of a transformer which creates a counter emf, or a suitable combination of the aforementioned elements. Depending upon what types of elements constitute the overswing impedance, the cutoff voltage is applied to the main thyristors V21-V23 within a period of from not entirely one-half up to the complete overswing interval. During this time, the polarity of voltage across the overswing capacitor is reversed so that the capacitor (or group of capacitors) has the opposite polarity and is ready to extinguish the lower group of thyristors V24-V26 at the start of the next phase. However, the voltage across the capacitor cannot re-attain its original amplitude, due to losses in the overswing circuit and in the commutating impedance Z61 itself. This is why the capacitors in the commutating impedance Z61 have to be charged. The charging can be achieved by delaying the switching on of the next subsequent main thyristor, so that the current flows into the load via the auxiliary valves, the commutating impedance Z61, and valves 31-36 of block 3. This, however, causes the initial condition on the capacitor and therefore the amplitude of the overswing current to depend considerably on the load current. Therefore, it is preferable to charge the capacitors in the commutating impedance Z61 from an auxiliary source by means of charging valves. Thus, for instance, it is possible to connect a source 9 and charging thyristors V101 and V102 to a charging impedance Z101, whereupon the supply terminals 2.1 and 2.2 of inverter block 2 are to be separated from source 9 by buffer circuits 7, 8. Alternatively, the commutating capacitor may be charged from capacitor C51 through a charging circuit 11, or charging sources can be connected in series with the overswing impedance (12, 13). The charging of commutation impedance Z61 will be discussed in greater detail below.

In the last paragraph, the operation of commutation block 6 has been described in detail. However, in order that the function of the inverter with three stage commutation be correctly understood it is felt advisable to additionally clarify the interaction of the individual blocks during the current commutation between the two main valves of valves V21 through V26 of the inverter block 2.

Let it be assumed that the current from the source 1 flows from the terminal 1.1 via terminal 2.1, valve V21 to the terminal 4.1 of load 4, and returns via L41, U41, U43 and L43 through the valve V26 back to the current source 1. The capacitors in the commutating impedance Z61 are ready to extinguish the upper half of the inverter 2, as e.g. by the positive polarity on the anode of valve V63. At the instant t0 (see FIG. 7) the switching-on of the auxiliary commutating valves takes place and the trapezoidal overswing begins; this means that, in the first phase, the current in the commutating circuit 6 begins to increase with a particular di/dt. Since the current from source 1 is constant, the current flowing through the valve V21 of inverter 2 must proportionally decrease as the commutating circuit current increases. However, as regards the load 4—as apparent from FIG. 7—the current keeps flowing to the terminal 4.1 but, on the one hand, via valve V21 and, on the other hand, through the path 7, V61, Z61, V63 and V31. At the instant t1 the complete current follows the new path and valve V21 is blocked. The overswing amplitude is always greater than the local current so that an excess current is drawn through overswing valve V65 and the overswing impedance Z62. The voltage drop across this reactance is applied via buffer circuit 7 and V31 in the cut-off direction to V21. If using a plain ohmic impedance Z62 (or a recuperating transformer operating to countervoltage) the blocking interval of the valve V21 is given by the period t2 minus t1. At the instant t2 the overswing dies out; its current just attains the load current magnitude. If the voltage on the capacitors in the commutating impedance Z61, which already has the opposite polarity at the instant t0, is higher, as to amplitude, than the voltage on the accumulating capacitor C51, the commutation of the load current changes its path from 7, V61, Z61, V63 to the path V22, V35, C51, V31, provided that the valve V22 already has, or is being given, an ignition pulse. Such commutation takes place up to the instant t3 at which the auxiliary valves are blocked and the entire current flows into the load 4 via V22, V35, C51 and V31. However, at the instant t2, there commences also the commutation of current in the individual phases of the load 4 which means that the current of phase 4.2 begins to increase and the current of phase 4.1 begins to decrease. The commutation power contained in L41 is transferred to the accumulating capacitor C51. The entire process is ended at the instant t4 at which the current of phase 4.1 completely dies out. Simultaneously, or within an interval before the next commutation, the commutating capacitor is charged in any of the afore-mentioned ways.

The above described commutation process constitutes a typical example of the situation occurring when the commutating capacitor is charged from auxiliary sources. When the commutation capacitor is charged by the load current it is possible to postpone the switch-on instant of the valve 22 so that then, within the interval between the instant t2 and the application of the ignition pulse to valve V22, the capacitor in the impedance Z61 is charged by the load current.

For charging the capacitors in the commutating impedance Z61 it is possible to choose one of several variants of the charging source. It is possible to connect the charging source 9 to the terminals 6.1 and 6.2, and to interconnect, between said terminals and the terminal 6.5, a charging circuit 10 comprising a charging impedance Z101 and charging valves thyristors V101 and V102. Ignition pulses for V101 or V102 are then applied simultaneously with those for V62, V64 or V61, V63, provided the impedance Z101 has a sufficiently high inductance or is an appropriately chosen supersaturated coil. Alternatively, it is also possible to retard pulses for V101, V102 and to prolong or double correspondingly the pulses for V61 and V62.

Another charging method consists in a parallel-connection of voltage sources 12, 13 to the overswing circuits V65, Z62 or V66, Z63. In this case either simultaneously with the overswing or with a delay, a part of the current flows via the charging circuit whereby it causes the transfer of power from the charging source to the capacitors in the commutating impedance Z61 or the charging takes place from the accumulating capacitor C51 via valves V111, V112 and charging impedance Z111, similarly as with charging from the auxiliary source 9.

While the invention has been illustrated in preferred embodiments, it is not to be limited to the circuits and structures shown, since many variations thereof will be evident to one skilled in the art and are intended to be encompassed in the present invention as set forth in the following claims.

What we claim is:

1. In a cyclically operable converter system having AC circuits having at least a first and second circuit associated, respectively, with a first and second AC phase, a DC circuit, a load, and controllable main switch means connected in said first and second circuit for controlling current flow therein, a three stage commutation system for transferring current from said first to said second circuit comprising
    auxiliary disconnect circuit means operative independently of said controllable main switch means for generating a blocking signal, applying said blocking signal to said controllable switch means of said first circuit, and taking over said current from said first circuit starting at a first predetermined time instant in said cyclical operation;
    and auxiliary accumulation circuit means connected to said auxiliary disconnect circuit means for receiving said current therefrom starting at a second predetermined time instant following said first predetermined time instant, and for transferring said current to said second phase, said auxiliary accumulation circuit means comprising an accumulating capacitor for storing commutation energy.

2. A converter system as set forth in claim 1, wherein said converter is an inverter;
    wherein said load is an inductive load; and
    wherein said accumulating capacitor stores commutation energy from said inductive load.

3. A converter system as set forth in claim 2, wherein said auxiliary disconnect circuit means comprises a commutating impedance comprising at least one commutating capacitor, auxiliary controllable switch means connected in series with said commutating impedance, overswing impedance means connected in series with said auxiliary controllable switch means, and means for precharging said commutating capacitor; further comprising means (V31-33) for applying the voltage across said overswing impedance to said controllable main switch means to constitute said blocking signal.

4. A converter system as set forth in claim 3, wherein said means for precharging said commutation capacitor comprises a charging circuit connected in parallel to said overswing impedance.

5. Three stage method for commutating current from a first phase to a second phase in a current converter comprising the steps of
    blocking current in said first phase and simultaneously transferring said current to an auxiliary disconnect branch;
    transferring said current from said auxiliary disconnect branch to an auxiliary accumulation branch and storing commutation energy in said auxiliary accumulation branch; and
    commutating said current from said auxiliary accumulation branch to said second phase.

6. A method as set forth in claim 5, wherein said step of commutating said current from said first phase comprises generating a blocking signal in said auxiliary disconnect circuit and applying said blocking signal to said first phase so as to block said current therein.

7. A method as set forth in claim 6, further comprising the step of
    commutating current from a first to a second load starting at a second predetermined time instant and continuing until said current for said second load is supplied only by said current in said second output phase.

* * * * *